UNITED STATES PATENT OFFICE.

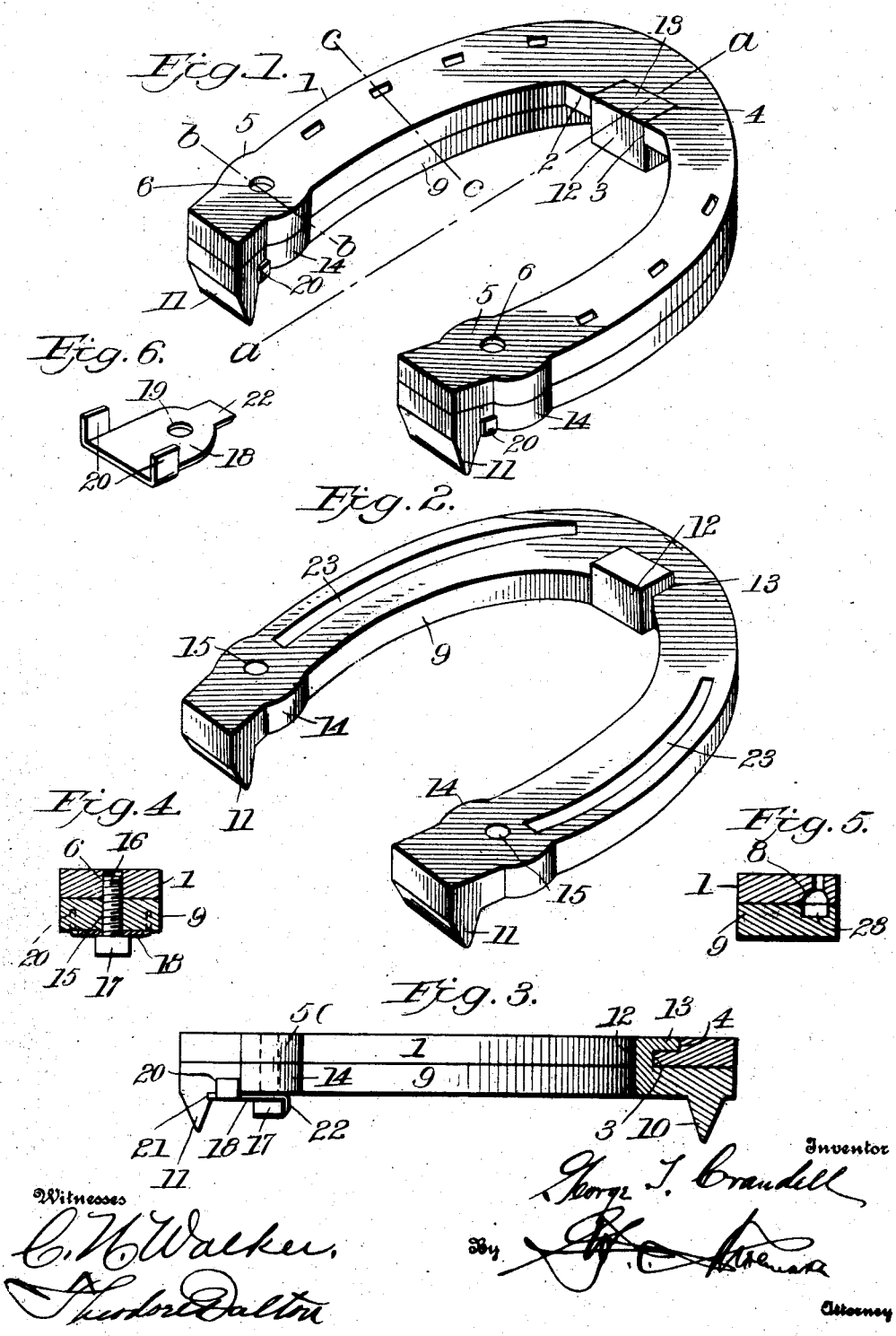

GEORGE T. CRANDELL, OF OMAHA, NEBRASKA.

HORSESHOE.

No. 854,198.  Specification of Letters Patent.  Patented May 21, 1907.

Application filed September 19, 1906. Serial No. 335,258.

*To all whom it may concern:*

Be it known that I, GEORGE T. CRANDELL, a citizen of the United States, residing at Omaha, in the county of Douglas and State of Nebraska, have invented certain new and useful Improvements in Horseshoes, of which the following is a specification.

This invention relates to horse shoes.

One object of the invention is to provide a shoe of the character stated whereby the animals may be shod frequently, if necessary, by a driver or other attendant about the stable, thereby obviating the necessity of taking the animal to a regular blacksmith to have the animal completely re-shod.

Another object of the invention resides in the provision of a horse shoe whose ground engaging member may be readily detached from the foot engaging part and the same or another similar or different ground engaging member expeditiously placed upon the animal's foot without withdrawing nails or driving the latter into the hoof.

There are certain periods in the year when there are icy streets and roads necessitating the roughening of the shoes of horses, mules and other animals to prevent them from slipping, and I have constructed my improved shoe in such manner that a roughened or other ground-engaging member may be readily attached to the animal's hoof without the usual trimming of the hoof and the driving of nails thereinto. Further, climatic and other conditions require that animals be frequently re-shod in order that their service will not be impaired through injury or otherwise. Aside from the fact that re-shoeing is expensive, considerable time is often lost both by the driver and as regards the use of the animal. Therefore, a still further object of my invention resides in the provision of a shoe constructed and arranged whereby a roughened or other ground-engaging member may be readily applied to the foot of an animal by any ordinary person until it becomes necessary to trim the animal's hoof and apply new nails thereto, my improved shoe thereby saving the loss of time heretofore experienced in frequently taking the animal to a regular smith.

With the above and other objects in view, the present invention consists in the combination and arrangement of parts hereinafter more fully described, shown in the accompanying drawings, and particularly pointed out in the appended claims; it being understood that changes may be made in the form, proportion, size and minor details without departing from the spirit or sacrificing any of the advantages of the invention.

In the drawings: Figure 1 is a perspective view of the invention; Fig. 2 is a detail view of the ground-engaging member detached from the foot-engaging member; Fig. 3 is a sectional view on the line *a—a* of Fig. 1; Fig. 4 is a sectional view on the line *b—b* of Fig. 1; Fig. 5 is a sectional view on the line *c—c* of Fig. 1; and Fig. 6 is a detail perspective view of one of the locking plates.

Referring now more particularly to the accompanying drawings, the reference character 1 indicates the foot-engaging member of the shoe whose toe portion is preferably enlarged, as at 2, and provided with a notch 3 leading into a recess 4 formed in the upper face of the foot-engaging member for a purpose presently explained. The heel portions of the member 1 are preferably, although not necessarily, enlarged, as at 5, and provided with screw-threaded or other perforations 6. The foot engaging member is provided with the usual side grooves 8 in which the heads of the securing nails are usually seated.

The detachable or ground-engaging member 9 of the shoe is provided with toe and heel calks 10 and 11, respectively, and these calks may be secured in place in any suitable manner. The toe portion of the ground-engaging member is provided upon its inner edge with a lug 12 designed to fit in the aforesaid notch 3 of the foot-engaging member and provided with an angular extension or lip 13 adapted to fit in the recess 4 of the last-named member with its upper face flush with the upper or inner face of said last-named member. This lug may be welded or otherwise secured fixedly or detachably to the ground engaging member, and besides binding the members together and preventing lateral displacement at the toe portions of one member with respect to the other, it prevents the ground-engaging member from moving forward of the foot-engaging member when the animal pulls forward.

The heel portions of the ground-engaging member may or may not be enlarged, as at 14, but in any event the heel portions at this point are provided with screw-threaded or other perforations 15 adapted to aline with the aforesaid perforations 6 of the foot-engaging member to receive the corresponding bolts or other suitable elements 16 designed to clamp or bind the heel portions of the members together and to prevent lateral movement of one member with respect to the other, as well as to prevent backward movement of the ground-engaging member when the animal is backing. Each bolt or other element 16 is preferably provided with a head 17, with each of which coöperates a lock plate 18 to prevent accidental displacement of the bolts or the like 16. The perforations 15 need not necessarily be screw threaded.

The lock plate 18, just referred to, lies against the outer or lower face of the ground-engaging member and is provided with a perforation 19 through which the aforesaid bolt 16 passes. The outer end of each plate 18 is provided with oppositely disposed bendable fingers 20 adapted to prevent accidental displacement of the plate itself. To prevent the accumulation of dirt beneath the plates as much as possible, if not entirely, and especially to relieve the fingers 20 of undue lateral strain, I fit the outer end of each plate in a transverse notch 21 in the corresponding heel calk 11, as shown. The inner end of each lock plate is provided with a finger 22, beveled as shown, and this finger is adapted to be bent into engagement with one side face of the head 17 of the bolt 16, whereby, by means of the fingers, the locking plates are held against displacement and the bolts 16 also locked against accidental displacement. The beveling of the finger 22 renders it comparatively thin and easy to bend it into and out of engagement with the head of the nut.

If desired, I might form grooves 23 in the inner or top face of the ground-engaging member to aline with the aforesaid grooves 8 in the outer or lower face of the foot-engaging member 1 for the purpose of fitting over the heads of the securing nails aforesaid if the latter should protrude outwardly a slight degree from the grooves to the foot-engaging member, thereby enabling the members to fit together snugly even if the nails should protrude as just explained.

It will now be understood that the foot-engaging member is fixedly secured to the hoof of the animal and that the ground-engaging member is detachably associated with the foot-engaging member, and that the ground-engaging member may be removed when desired. With each set of shoes there may be one, two or more of the ground engaging members, so that when one is worn out another may be substituted therefor. Further, if the ground engaging member is not needed during certain periods of the year, it may be removed and the foot engaging member only worn by the animal. Moreover, ground engaging members with worn calks may be used with the foot engaging members.

The invention is simple and the parts are positively locked together against accidental displacement.

What is claimed is:

1. A horseshoe comprising a foot engaging member, a ground engaging member provided with toe and heel calks, the heel calks each having a notch in it, means for securing the toe portions of the members together, and plates for locking the heel portions of the members together, one element of each plate fitting in the notch of the corresponding heel calk.

2. A horseshoe comprising a foot engaging member, a ground engaging member provided with toe and heel calks, means for securing the toe portions together, and means for locking the heel portions together, the latter means interlocking with the heel calks.

3. A horseshoe comprising a foot engaging member, a ground engaging member, provided with toe and heel calks, means for securing the toe portions of the members together, bolts passed through the heel portions of the members, each bolt having a head, a plate embracing each bolt and interlocking with the corresponding heel calk, each plate having oppositely disposed fingers for engagement with corresponding sides of the ground engaging member and also having a finger engaging the head of the corresponding bolt, the latter finger being beveled toward its outer end.

4. A horse shoe comprising a foot engaging member, a ground-engaging member provided with toe and heel calks, the heel calks each having a notch in it, means for securing the toe portions of the members together, and means for locking the heel portions of the members together, one element of the last-mentioned means fitting in the notch of the corresponding heel calks.

In testimony whereof I have signed my name to this specification in the presence of two subscribing witnesses.

GEORGE T. CRANDELL.

Witnesses:
    MARION G. CRANDELL,
    ELLA J. SQUIRES.